United States Patent [19]

Watanabe et al.

[11] 4,234,137
[45] Nov. 18, 1980

[54] TAPE REEL FOR VIDEO TAPE CASSETTE

[75] Inventors: Koji Watanabe, Niiza; Akira Nakagawa, Tokyo, both of Japan

[73] Assignee: Nifco Inc., Yokohama, Japan

[21] Appl. No.: 65,810

[22] Filed: Aug. 13, 1979

[30] Foreign Application Priority Data

Aug. 11, 1978 [JP] Japan .................................. 53-97296

[51] Int. Cl.³ ............................................ B65H 75/14
[52] U.S. Cl. .................................... 242/71.8; 242/198
[58] Field of Search .................. 242/71.8, 71.9, 198, 242/115, 116, 118.6, 118.61, 118.62, 197, 199, 200

[56] References Cited

U.S. PATENT DOCUMENTS

| 3,189,294 | 6/1965 | Morningstar et al. | 242/71.8 |
| 3,934,839 | 1/1976 | Serizawa | 242/198 |
| 3,980,255 | 9/1976 | Serizawa | 242/198 |
| 4,078,741 | 3/1978 | Underwood | 242/115 X |
| 4,101,095 | 7/1978 | Carter | 242/71.9 X |

Primary Examiner—John M. Jillions
Attorney, Agent, or Firm—Thomas Buckman; Jack R. Halvorsen

[57] ABSTRACT

Disclosed herein is an improvement in and concerning a tape reel of the type used in a video tape cassette and comprising a hub, flanges disposed one each at the opposite axial ends of the hub, and a small protuberance formed at the center of at least one end surface of the hub and adapted for engagement with a matching socket in the tape reel holder of the cassette housing, which improvement resides in the construction of the tape reel wherein a member for carrying the aforementioned small protuberance is produced, independently of the flanges and the hub, of a resin resistant to abrasion in a design such that the assemblage of the reel is accomplished by fixing the flanges onto the hub through the medium of the small protuberance carrier member.

6 Claims, 24 Drawing Figures

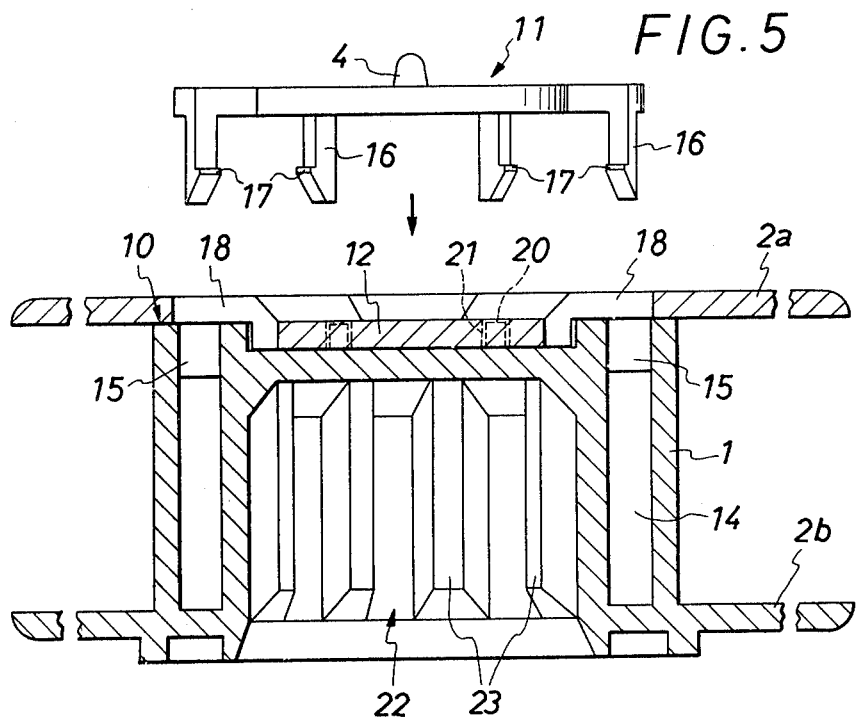
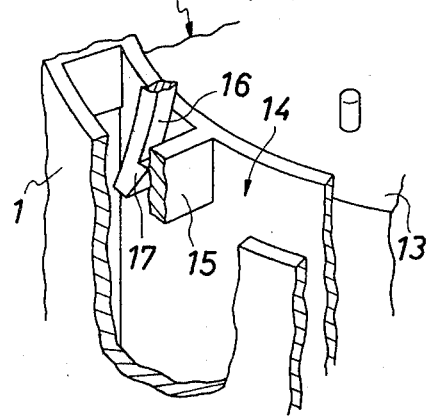

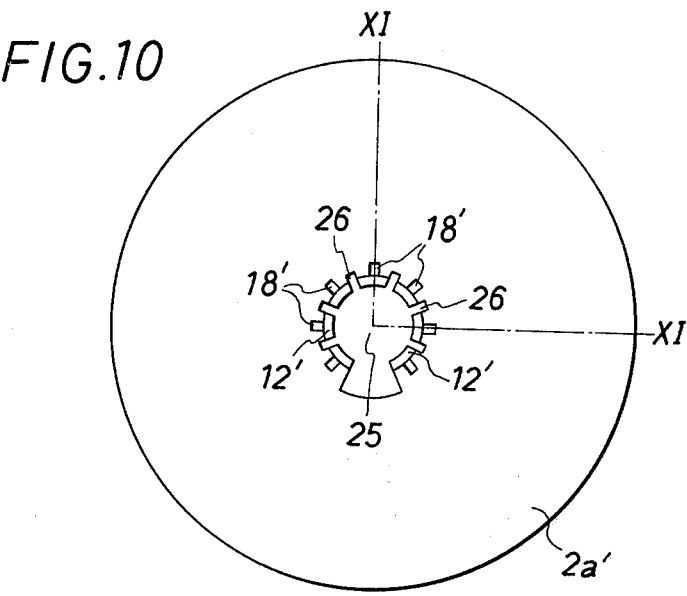
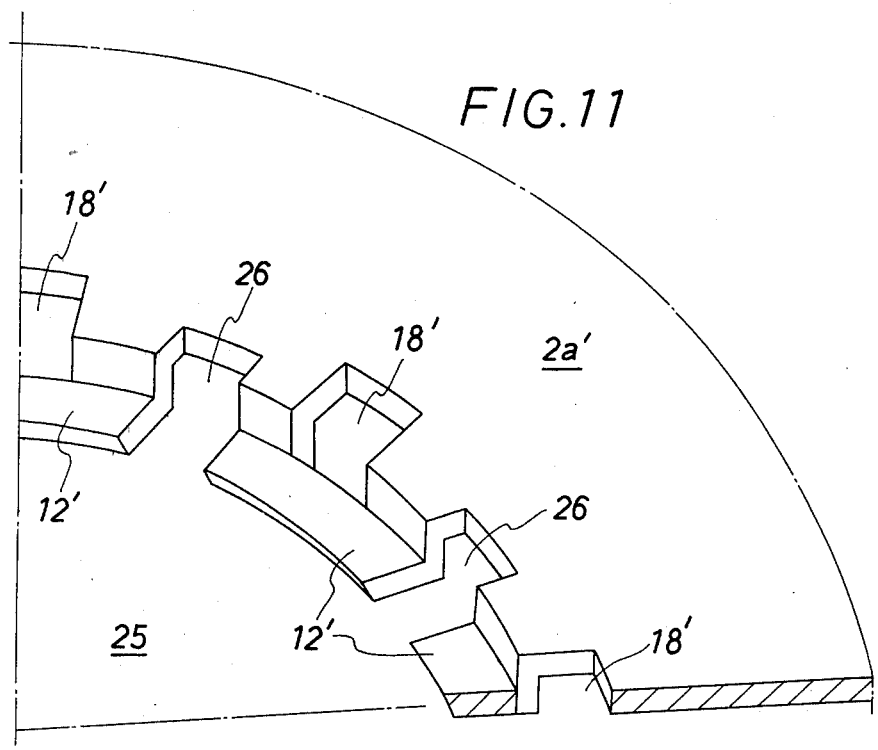

TAPE REEL FOR VIDEO TAPE CASSETTE

BACKGROUND OF THE INVENTION

This invention relates to a tape reel for use in a cassette video tape assembly.

Generally, the cassette video tape assemblies are designed so that the tape will usually have to be unwound or rewound in a slightly oblique position. When the tape reel continues to be maintained in a horizontal position, therefore, an immoderate force is exerted on the tape being unwound or rewound. To preclude this adverse effect, it becomes necessary for the tape reel itself to be inclined obliquely to an angle proportionate to the unwinding or rewinding angle of the tape. It is imperative on the other hand that the tape reel, even while it is held in an inclined position as described above, should maintain safe engagement with the reel spindle.

At the time that the tape reel is set in position within the cassette housing, therefore, since the rebound piece in the form of a leaf spring disposed on the cover of the housing comes into point contact with the small protuberance formed at the center of the upper flange of the tape reel and the reel spindle is set in position and carried on the lower flange of the tape reel, the tape reel set in the housing is allowed to be inclined to a certain degree. Further since the resilient rebound piece keeps the tape reel pressed downwardly through the medium of the small protuberance, the inclination of the tape reel causes the reel neither to rise from its fixed position nor to produce any play during its rotation. Consequently, the tape reel is allowed to safely retain its fast engagement with the reel spindle.

As may readily be inferred from the construction described above, the friction between the small protuberance and the resilient rebound piece continues so long as the tape is in motion and this continued friction occurs as frequently as the cassette video tape is put to use. For protection against possible abrasion, therefore, the small protuberance is required to be made of a material which specifically excels in rigidity and resistance to abrasion. The material is also required to be excellent in dimensional accuracy. This is because the reel rotates with uneven motion or with vibration when the tip of the small protuberance fails to fall on the true axis of the reel.

The resilient rebound piece is made of a suitable metal to ensure ease of its fabrication and perfection of its function. Similarly, to facilitate easy fabrication, the tape reel is made of a synthetic resin. The material which best satisfies the various conditions the small protuberance is expected to fulfil is polyacetal. Unfortunately, resinous materials of the class excelling in wear resistance, rigidity and dimensional accuracy turn out to be extremely expensive. In spite of the high cost, tape reels of the conventional construction must use expensive material not merely in the small protuberance but also in large amounts for other adjacent parts which do not particularly require the properties of an expensive resin, solely because the small protuberance necessitates use of that particular material. The use of large amounts of expensive material is indispensable because the major factor in reducing the cost of tape reel manufacture lies in the reduction of the number of component parts used and the number of work steps involved in the reel assemblage.

The upper flange of the tape reel is made of a transparent resin in order that the user may freely observe the tape being unwound out of or rewound on the reel disposed under the flange. Since polyacetal and other similar resins possessed of high wear resistance are generally opaque, it has not been possible to use the simple expedient of molding the small protuberance at the center of the upper flange as an integral part thereof.

An object of this invention is to provide a tape reel for a video tape cassette which, in view of the aforementioned true state of affairs, is directed to minimizing the consumption of the expensive material and consequently lowering the cost of production.

Another object of this invention is to provide a tape reel which can be manufactured by following, to the fullest possible extent and without any complication, the simplest procedure of assemblage heretofore practiced in the art.

SUMMARY OF THE INVENTION

To attain the objects described above according to the present invention, there is provided a tape reel for a video tape cassette comprising a hub having a first flange disposed on one end surface and a plurality of first engaging means disposed near the other end surface thereof, a second flange having a plurality of openings, and a carrier member having a small protuberance at the center of one surface and a plurality of second engaging means disposed on the other surface thereof, the carrier member passing through the plurality of openings of the second flange and subsequently engaging with the plurality of first engaging means of the hub, the engagement between the plurality of first and second engaging means allowing the second flange to be fixed between the carrier member and the other end surface of the hub.

The tape reel for use in a video tape cassette according to the present invention is composed of the three elements described above. However, since the element made of an expensive resin with excellent rigidity and abrasion resistance characteristics is miniaturized and since the assemblage can be accomplished by mere snapping action without requiring any special tool, the present tape reel is advantageous from an economical point of view.

BRIEF EXPLANATION OF THE DRAWING

FIG. 5 is a partially sectioned view of the component parts of the tape reel shown in FIG. 4.

FIG. 6(A) is a partially cut-away perspective view of important parts of the tape reel of FIG. 4 in a position assumed during the assemblage of the reel.

FIG. 6(B) is similarly a partially cut-away perspective view of the same important parts of the tape reel of FIG. 4 in a position assumed after completion of the assemblage of reel.

FIG. 10 is a plan view of the upper flange in the second preferred embodiment.

FIG. 11 is an enlarged perspective view of important parts taken along the line XI—XI of the diagram of FIG. 10.

DESCRIPTION OF THE PREFERRED EMBODIMENT

Figure 1:
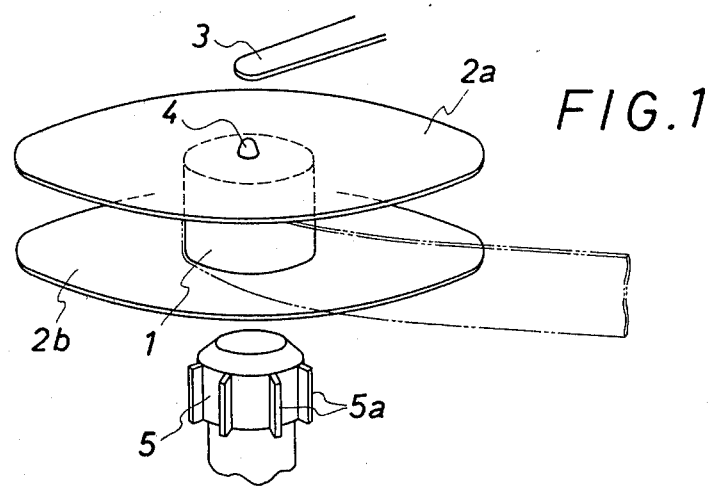
FIG. 1 is a schematic perspective view of the cassette video tape reel to which the present invention is directed.

Generally, the cassette type video tape reel, which is similar in overall shape to the ordinary open reel for audio tape, is provided with a hub 1 serving as the core for winding thereon a tape and two disc-shaped flanges 2a, 2b of a suitable radius disposed at the opposite axial ends of the hub as illustrated in FIG. 1. Differently from audio tape reels, however, the video tape reel is provided at the center of one of the axial ends of the hub with a small protuberance 4 which, when the tape reel is set in position within the cassette housing (not shown), comes into contact with the rebound piece 3 in the form of a leaf spring disposed on the cover of the cassette housing.

On the other axial end of the hub, there is formed an engaging hole for admitting a reel spindle 5 on the tape transport side which is inerted therein through an opening formed in the cassette housing (not shown). A plurality of ridges 5a on the periphery of the reel spindle 5 are received in the intervening spaces between as many ridges formed on the inner wall of this engaging hole to establish tight union between the shaft and the hole and thereby produce the function of torque transfer. Since this particular function has no direct bearing upon this invention, the construction of the latter axial end of the hub will not be described further.

The cassette video tape assembly is generally designed so that the unwinding or rewinding of the tape is carried out in a somewhat inclined position. An immoderate force is exerted on the tape in motion when the tape reel is kept in its horizontal position. To preclude this adverse effect, therefore, the tape reel itself is required to be inclined to an angle proportionate to the unwinding or rewinding angle of the tape. It is, in the meantime, important that the tape reel should maintain safe engagement with the reel spindle even when the tape reel is inclined. To assure the maintenance of this safe engagement, the small protuberance 4 is given a shape resembling the tip of a pivot shaft and, therefore, is allowed to come into point contact with the resilient rebound piece 3. Consequently, the tape reel is allowed to continue its rotation at a certain angle of inclination relative to the spindle 5.

While the tape is in motion, this small protuberance 4 is kept in the state of friction contact with the resilient rebound piece 3. Because of this inevitable friction, the small protuberance 4 is required to be made of a material which specifically excels in rigidity and resistance to abrasion.

Figure 2:
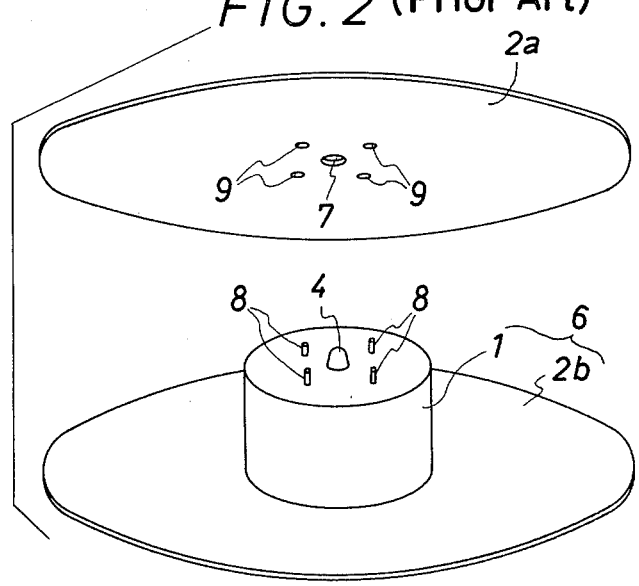
FIG. 2 is an exploded perspective view of the cassette video tape reel known to the art.
Figure 3:
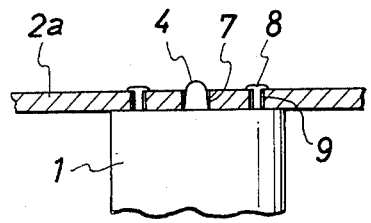
FIG. 3 is a partially sectioned view of an important part of the tape reel of FIG. 2.
Figure 4:
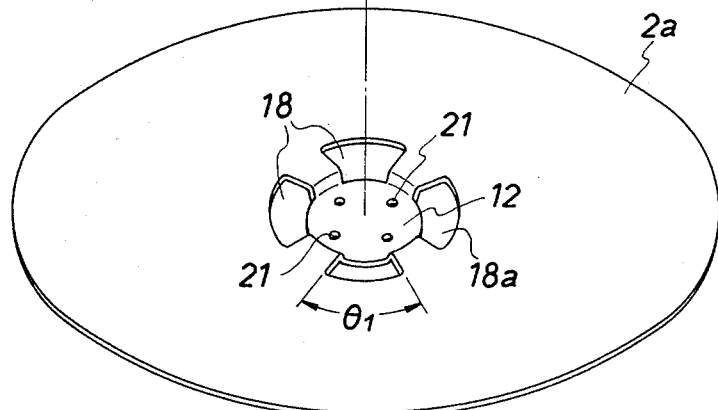
FIG. 4 is an exploded perspective view of the first preferred embodiment of the tape reel according to the present invention.

The resilient rebound piece 3 is made of a suitable material to ensure ease in fabrication and precision in operation. Similarly the tape reel is usually made of a PAC resin. For convenience in fabrication, the expensive PAC resin not merely is used for the small protuberance but also must be inevitably used for other parts as well. The reason for this is as follows. In the conventional tape reel construction, the best way of improving the efficiency of tape reel manufacture by decreasing the number of component parts required and minimizing the number of work steps involved, is by utilizing the oneshot integral molding technique. This is, however, not practicable because it involves the necessity for incorporation in the tape reel of a device for the fast retention of tape end. As the next best solution, therefore, the method having by far the widest adoption is that whereby a part 6 having a hub 1 and one flange 2b is integrally molded and the other flange 2a molded all by itself as illustrated in FIG. 2 are put together to complete one tape reel. As a natural consequence, the small protuberance 4 is formed on the hub 1 and allowed to protrude from the reel proper through a hole perforated at the center of the separately molded flange 2a. The part 6 on which the small protuberance 4 is formed, therefore, must be molded wholly with the expensive material possessed of the properties required for the small protuberance 4.

Actually in the conventional tape reel, solely because of the presence of this small protuberance 4, even the hub and the flanges which, by nature, could have been made of a far less expensive material are made of PAC resin, seriously increasing the overall cost of tape reel manufacture. In the construction shown in FIG. 2, the consumption of the expensive material would naturally be smaller if the small protuberance 4 were formed on the separately molded flange 2a than when it is formed on the part 6 including the hub 1. Actually, however, this practice of forming the small protuberance on the flange 2a is generally dismissed as impracticable for the reason described below.

Specifically for a tape reel of this type, it is one essential requirement that the user should be able to freely observe the portion of the tape still remaining on the reel. Since the side of the tape reel from which the small protuberance 4 emerges confronts the window of the cassette housing, the separately molded flange 2a is required to be transparent. PAC resin is, however, opaque.

In view of the state of affairs described above, this invention has as its primary object the manufacture of an inexpensive tape reel. It has a supplementary object of accomplishing the assemblage of the aforementioned tape reel by following, to the fullest possible extent, the simplest of conventional methods without any useless complication.

For thorough comprehension of this supplementary object, the conventional methods available for the assemblage will be described below.

One basic method is based on a procedure involving the steps of preparing a part 6 having a hub 1 and one flange 2b molded integrally, with a small protuberance 4 formed on the free axial end of the hub 1 in conjunction with a plurality of suitably spaced pins 8, and a separately molded flange 2a as illustrated in FIG. 2, setting the flange 2a in position on the free axial end of the hub 1, allowing the plurality of pins 8 to penetrate through the matching holes 9 perforated in the flange 2a, and thereafter crushing the protruding tips of the pins as by means of ultrasonic wave fusion. This method, however, rather consumes considerable time and requires installation of an ultrasonic wave welder and other peripheral devices.

In contrast to this method, there has also been proposed a method which involves the steps of preparing similarly the part 6 and the separately molded flange 2a with the exception that the flange 2a has a proper number of engaging legs protrude from the underside thereof in the direction of the free axial end of the hub 1 on the other flange 2b and the hub 1 is provided on the free axial end thereof with as many matching crosspieces or rungs adapted to enable the engaging legs to advance and go into tight union therewith by virtue of the snapping action or other similar resilient motion of the legs, and thereafter simply combining the aforementioned two separately molded parts into one whole piece. The present invention aims to attain the aforementioned primary object and, at the same time, adopt these conventional methods of assemblage without entailing any noticeable inconvenience.

Now, the present invention will be described in detail below by reference to its illustrated preferred embodiments. Generally, this invention concerns a video tape reel of the class possessed of a protuberance in the axial direction at the center of the tape reel, which tape reel is characterized by having the flange on the protuberance side and the hub joined with each other through the medium of engaging means formed on a separately molded protuberance part. On the assumption that the flange and the hub are integrally molded in advance, therefore, the tape reel of this invention comprises at least three component parts, i.e., the protuberance part, the flange on the protuberance side and the other flange incorporating the hub.

First, the first preferred embodiment of this invention will be described with reference to FIGS. 4 through 7. In this preferred embodiment, the flange 2b falling on the side opposite that of the protuberance, namely the flange confronting the aforementioned reel spindle 5, and the hub 1 are integrally molded in advance to form one independent part 6. The other flange 2a and the hub 1 are separate of each other. The axial end 10 of the hub falling on the side of the flange 2a is a free end.

In the tape reel of this invention, the small protuberance 4 which engages the rebound piece (not shown) on the cassette housing side is further separate from the separately molded flange 2a and is carried by a disc-shaped carrier means 11 smaller in diameter than the hub.

In the present preferred embodiment, the disc-shaped carrier means 11 is given a wall thickness substantially equal to the wall thickness of the flange 2a and the central portion 12 of the flange 2a on which the carrier means 11 is mounted is depressed to a depth equalling the wall thickness of the carrier means so that the surface of the flange 2a falls practically flush with the surface of the disc-shaped carrier means 11 when the carrier means 11 is mounted on the flange 2a which in turn rests on top of the free end 10 of the hub 1.

On the free end 10 of the hub 1, there is formed a recess 13 for receiving the central depressed portion 12 of the flange 2a, with the center of the recess 13 aligned with the axis of the hub 1.

To permit assemblage of the hub, the flange and the separately molded small protuberance carrier means 11, as used as the carrier means 11 and the free end 10 of the hub 1, are provided with mutually complementary engaging means.

In this case, the engaging means 16 which protrude from the carrier means 11 in the direction of the hub 1 are in the form of legs possessed of circumferentially extending claws 17 adapted to be hooked fast by as many crosspieces 15 formed inside the grooves 14 formed in the circumferential direction close to the periphery of the free end of the hub 1. The leg-shaped engaging means 16 are formed so as to hang down from the opposite circumferential extremities of a plurality of fan-shaped portions radially extending outwardly from the main part 11a of the disc-shaped carrier means 11 and possessing a fixed area subtending a suitable angle θ, such as, for example, the three portions 11b of the four equally spaced extended portions involving a fixed phase of 90° in the illustrated preferred embodiment. The pair of leg-shaped engaging means 16 hanging down from the opposite extremeties of each extended portion 11b are opposed to each other, with the claws 17 extending in mutually opposite directions.

In the separately molded flange 2a, around the central depressed portion 12 for admitting the central main part 11a of the carrier means 11, openings 18 capable of permitting passage therethrough of the leg-shaped engaging means 16 and, at the same time, receiving the extended portions 11b of the carrier means 11 are formed at corresponding locations. In this case, an extra opening is formed at the location 18a corresponding to the position of the carrier means 11 at which one of the four equally spaced extended portions is missing so as to deprive the carrier means 11 of its directionality and add to the convenience of the assembling work to be described afterward. Incidentally at the position of the outer wall of the hub 1 corresponding to the position of the carrier means from which one of the four extended portions is missing, there is generally disposed a retainer part 19 for holding in position the tail end of the tape.

The size in the radial direction of each of the openings 18 formed in the flange 2a may be practically equal to that of the corresponding extended portion 11b of the carrier means 11. The angle subtended by the outer arc of the opening 18, however, must be such as to equal the sum of the angle $\theta$ subtended by the outer arc of the corresponding extended portion and the angles subtended by the arcs of the two oppositely extending claws 17.

On the other hand, the crosspiece 15 (engaging means) formed in the hub 1 are disposed at positions at which they are allowed to engage the claws 17 of the leg-shaped engaging means 16. In this case, since one pair of leg-shaped engaging means 16 and one extended portion of the carrier means 11 are combined as one set, the crosspieces 15 may be described conveniently by reference to their correspondence to the sets mentioned above.

In the present preferred embodiment, three sets each of a pair of crosspieces 15 are disposed at three of a total of four equally spaced points involving a fixed phase of 90°, with the remaining one point being occupied by the tape end retainer part 19. These crosspieces 15 are disposed so as to cross, in the radial direction, the grooves 14 formed in the circumferential direction close to the periphery of the hub. The angle subtended by the arc of the groove between the opposed surfaces of each set of crosspieces is roughly equal to the angle $\theta$ subtended by the outer arc of the corresponding extended portion of the carrier means. This means that the angle $\theta_1$ subtended by the arc extending between the tips of the oppositely extended claws of the pair of leg-shaped engaging means is the sum of the aforementioned angle $\theta$ and the angles subtended by the two small arcs corresponding to the oppositely extended claws. The angle subtended by the circumferential distance between the opposite surfaces of the pair of crosspieces in each set is only required to be such as to give the crosspieces 15 a thickness which, as will be described afterward, is sufficient for the claws 17 to be effectively hooked on the undersides of the corresponding crosspieces 15. In the present preferred embodiment, this angle is approximately equal to the angle $\theta_1$ which is subtended by the arc extending circumferentially between the tips of the two claws of each pair of leg-shaped engaging means.

The tape reel of the present preferred embodiment which has the construction as described above is assembled as follows.

First, as illustrated in FIG. 5, the separately molded flange 2a is mounted on the free end 10 of the hub 1 in such a manner that the central depressed portion 12 enters the recess 13 of the hub 1. In this case, the relative position between the flange 2a and the free end 10 is such that the openings 18 of the flange 2a coincide with the circumferential intervals between the crosspieces 15, 15 which each subtend the angle $\theta$. This positioning may be facilitated, as will become evident from the reference to FIG. 5 taken together with FIG. 4, by raising one or more pins 20 from the bottom surface of the recess 13 of the hub 1 and forming, on the flange side, corresponding holes 21 for receiving the pins and thereby allowing the exact positioning of the flange 2a relative to the free end 10 to be obtained by simply having the pins 20 inserted into the corresponding holes 21, for example. These pins 20 should be given a height such that they will not protrude from the opposite side of the flange 2a. Otherwise, their protruding tips will interfere with the subsequent work of mounting the carrier means 11 with the small protuberance 4 on the flange 2a. In an extreme case, the carrier means may also be required to be provided with small holes for receiving these protruding tips of the pins 20.

Incidentally in FIG. 5, there are also illustrated a plurality of projections 23 which are disposed on the inner wall of the bore 22 formed at the center of the flange 2b molded in advance integrally with the hub and which are adapted to engage the engaging projections (not shown) of the reel spindle. Since these projections 23 have no direct bearing upon the working of the tape reel of this invention, they are merely illustrated in the drawing and are not given any further mention.

Figure 7:
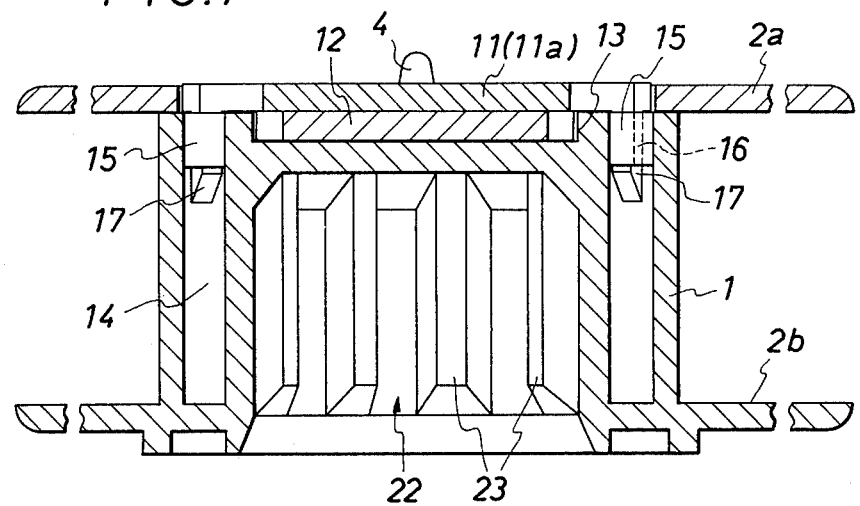
FIG. 7 is a longitudinally sectioned view of the tape reel of FIG. 4 in the state assumed after completion of the assemblage of reel.

After the separately molded flange 2a has been positioned as described above, the separately molded small protuberance carrier means 11 is applied to the flange 2a in such a manner that the central principal portion 11a thereof will rest snugly inside the central depressed portion 12 of the flange 2a. In this case, the extended portions 11b of the carrier means 11 are set into the openings on the flange 2a and, at the same time, the leg-shaped engaging means are squeezed into the grooves 14 while being inwardly bent in the circumferential direction because the claws at their leading ends extend outwardly further than the corresponding pair of crosspieces 15, 15 and, therefore, are complelled to scrape the circumferentially inner surfaces of the pair of crosspieces 15, during the initial stage of the insertion of the carrier means, as illustrated in FIG. 6(A). When the claws 17 finally ride over the crosspieces 15, they snap and rebound in the circumferential direction to their original positions by virtue of the resilience of the material of which they are made and hook themselves unreturnably on the undersides of the crosspieces 15 as illustrated in FIG. 6(B). Consequently, the flange 2a comes to be safely retained between the free end of the hub 1 and the small protuberance carrier means 11 (particularly the central principal part 11a thereof) as illustrated in FIG. 7. Naturally, in the leg-shaped engaging means 16, the length from the lower surface of the extended portions to the upper surface of the claws 17 is adjusted so as to be equal to or slightly less than the axial length to the lower surface of the crosspieces 15.

In the present preferred embodiment, the thickness of each crosspieces 15 in the circumferential direction is approximately equal to that of the upper surface of the claw 17. What is essential is the fact that the claws 17 are hooked on the undersides of the crosspieces 15. Thus, the thickness may be smaller or, conversely, may be greater. When necessary, the crosspieces 15, 15 corresponding to the adjacent engaging means 16, 16 of the two neighboring extended portions 11b, 11b of the carrier means may have their thickness increased until they finally merge into one solid piece and the space S (FIG. 4) intervening between the aforementioned crosspieces ceases to exist. In the present preferred embodiment, the space S is interposed as illustrated merely for the purpose of saving the material otherwise required to fill up this space. In the case of the present preferred embodiment, therefore, the undersides of the crosspieces may well be collectively thought of as complementary engaging means defined circumferentially in the radial directions within the groove adapted for insertion of the leg-shaped engaging means.

In any event, as may readily be inferred from the disclosure of the preferred embodiment above, this invention enables use of polyacetal or other similar expensive material required for the small protuberance 4 to be limited to the carrier means 11 incorporating the small protuberance and permits the hub, the flange, etc. to be made of an inexpensive material. Thus, this invention provides a tape reel which enjoys notably high economy and great ease of assemblage.

The number and location of the engaging means 16 may freely be changed insofar as the desired function of engagement is realized.

The preferred embodiment illustrated in FIGS. 8 through 15 and described herein after is identical in general construction and effect with the preceding preferred embodiment but involves a modification in the sense that the two sets of supplementary engaging means are brought into mutual engagement in the radial directions. In the description of the second preferred embodiment, therefore, identical and similar components are denoted by identical symbols and like symbols with a prime (').

Figure 8:
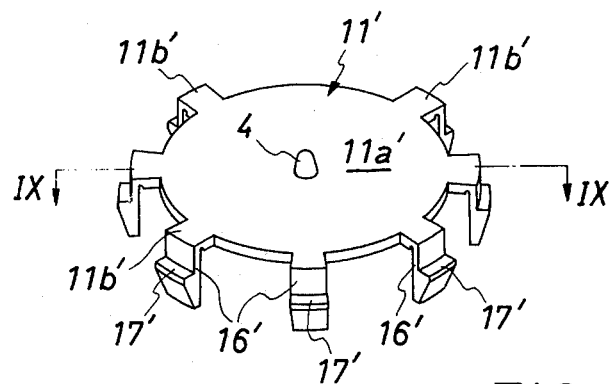
FIG. 8 is a perspective view of small protuberance carrier means in the second preferred embodiment of the tape reel according to the present invention.
Figure 9:
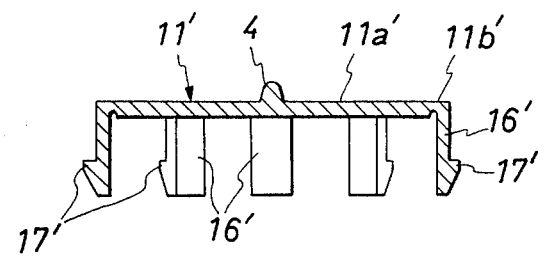
FIG. 9 is a longitudinally sectioned view of the same means taken along the line IX-IX in the diagram of FIG. 8.

As illustrated in FIGS. 8 and 9, the central principal part 11a' of the carrier means 11' serving to carry the small protuberance 4 closely resembles a disc, while the extended portions 11b' protruding from the periphery of the central principal part 11a' are modified in that they each have one engaging means or engaging leg 16' hanging down from the leading ends thereof. Also the engaging claws 17' at the leading ends of the engaging legs are modified in that they have their upper surfaces on the outside relative to their radial directions. In this preferred embodiment, the extended portions 11' or the engaging legs 16' are disposed at seven of a total of eight equally spaced points involving a fixed phase of 45°. The remaining one point is reserved for disposition of the tape end retainer part 19' on the hub 1 side (FIG. 12) similarly to the first preferred embodiment.

At least the leading ends of the extended portions 11b' and the leg-shaped engaging means 16' hanging down from these leading ends are adapted so that they enter the openings formed at the corresponding position in the flange 2a' and, after passing through the flange 2a', come into engagement with the complementary engaging means on the hub 1' side.

Figure 12:
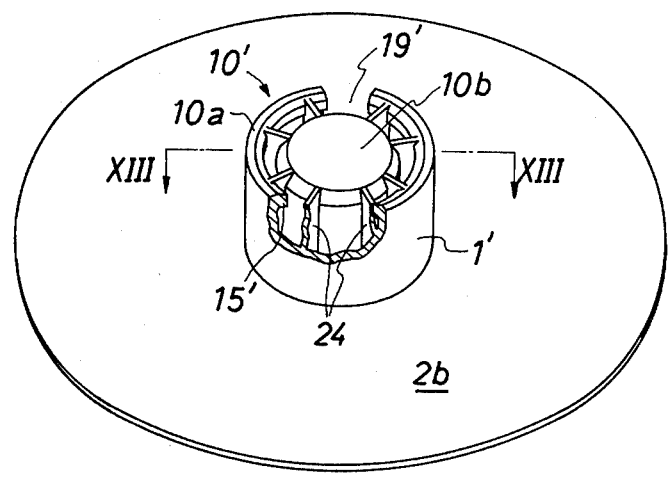
FIG. 12 is a perspective view of the hub and the lower flange in the second preferred embodiment.
Figure 13:
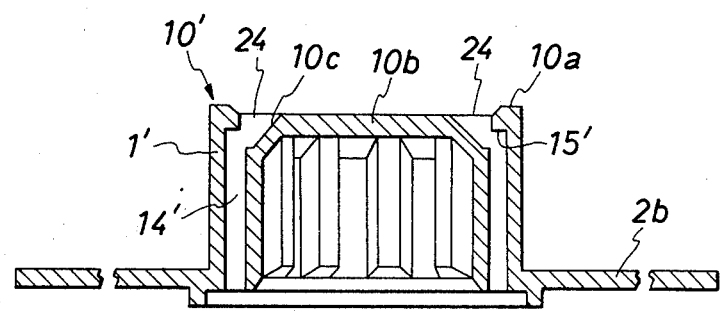
FIG. 13 is a longitudinally sectioned view taken along the line XIII—XIII of the diagram of FIG. 12.

For the sake of convenience, the description of this preferred embodiment will be started with the engaging means on the hub 1 side with reference to FIGS. 12 and 13.

In this case, the peripheral edge 10a of the hub has a relatively large radial wall thickness to a small depth from the free end in the axial direction of the hub and a small radial wall thickness in the rest of the whole depth of the hub. The downwardly stepped surface 15' which is consequently formed where the wall thickness of the peripheral edge changes as described above serves as the engaging means. In order that the engaging legs 16' may be allowed to advance toward this stepped surface 15', a groove 14' is formed along the peripheral edge 10a inwardly of the stepped surface. Lest this groove should separate the outer portion of the hub from the central portion 10b, a plurality of ribs 24 are formed across the groove 14' in the radial directions to bind the two portions to each other. While the crosspieces involved in the first preferred embodiment serve as the engaging means, these ribs 24 have no such function but simply function as binding means between the peripheral portion and the central portion of the hub. Thus, they serve their purpose when disposed freely at positions where they are not struck by the incoming engaging legs.

The relationship between the flange 2a and the hub 1 in the present preferred embodiment may be such as to permit fast union through mutual insertion similarly to the first preferred embodiment, except for a slight modification as described below.

First on the side of the separately molded flange 2a' depressed portions 12' are disposed one each close to the center of the openings 18'. Unlike the first preferred embodiment, the present preferred embodiment is provided with a central opening 25 in the central portion corresponding to the free end of the central portion 10b of the hub 1'. Thus, the inner edges 12a of the depressed portions 12' are allowed to come into contact with the outer edge of the central portion 10b of the hub. In other words, the central portion 10b of the hub is inserted into the central opening 25 of the flange 2a' and the depressed portions 12' adjacent to the central opening 25 on the flange 2a' side enter the groove 14' to a small depth when the flange 2a' is mounted on the free end 10' of the hub 1' as illustrated in FIG. 14.

In the present preferred embodiment, since the aforementioned binding ribs 24 are disposed between the openings 18', 18' for the insertion of the engaging legs up to a height substantially reaching the free end of the hub, radial grooves 26 are cut between the openings 18', 18' on the flange 2a' so that the ribs will not collide into the depressed portions when the flange 2a' is mounted on the free end of the hub as described above. They fulfil an additional function as positioners which permit the openings 18' in the flange 2a' for the insertion of the engaging legs to be accurately positioned where the ribs 24 are absent.

Figure 14:
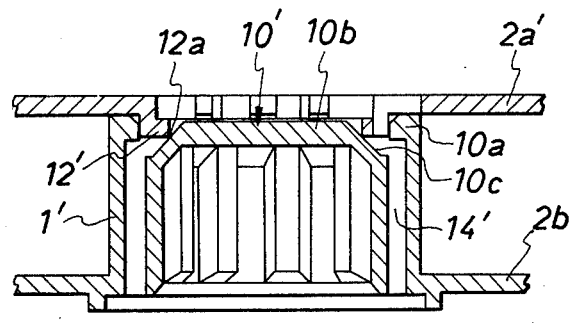
FIG. 14 is a longitudinally sectioned view illustrating the upper flange in a state assembled with the hub and the lower flange.
Figure 15:
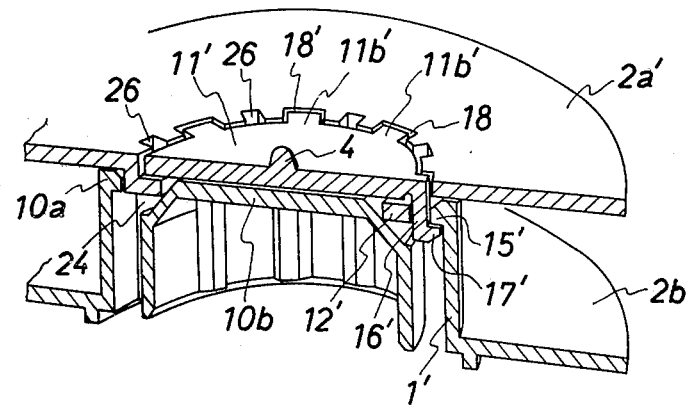
FIG. 15 is a partially sectioned perspective view of the tape reel of FIG. 8 in a state assumed after completion of the assemblage of the reel.

After the flange 2a' has been set in position as illustrated in FIG. 14, the small protuberance carrier means 11' pushed in in such a manner that the engaging legs 16' pass through the openings 18' of the flange 2a'. Consequently, during the first stage of this insertion, the claws 17' at the leading ends of the engaging legs 16' are displaced inwardly in the radial directions as they come into contact with the inner surface of the peripheral edge 10a of the free end of the hub. When they advance and reach the stepped surface 15, they snap and rebound to their original positions by virtue of the resilience of the legs 16' and, as a result, the upper surfaces of the claws unreturnably engage with the stepped surface 15, bringing the assemblage to completion. Consequently, the flange comes to be retained tightly between the carrier means 11' and the free end of the hub because the depressed portions 12' are held down firmly behind the corresponding extended portions 11b' of the small protuberance carrier means 11'.

Needless the say, the number of engaging means 16' called "engaging legs" herein and the angles subtended by the circumferential intervals between these engaging legs are matters of free choice also in this preferred embodiment.

The two preferred embodiments so far described both rely for assemblage of their component parts upon the simple phenomenon that the squeezed engaging means snap and rebound to their original shape. Besides the devices illustrated, various push-in type fasteners known to the art may be effectively applied to the assemblage of the tape reel of the present invention. Otherwise, there may be adopted a construction wherein the engaging lens or other similar engaging means extended from the free end of the hub are provided at their leading ends with claws protruding inwardly in the radial directions so that the hub and the small protuberance carrier means is brought into tight union when the aforementioned claws snap into intimate engagement with the outer edge of the carrier means serving as the complementary engaging means (as disclosed in Japanese Utility Model Publication No. 34586/1975, for example). The preferred embodiment to be described herein below effects the assemblage of the tape reel by the small protuberance carrier means being designed to that the tight union of the carrier means with the hub is obtained by inserting the carrier means to a certain depth in the hub and thereafter rotating it to a certain degree around the axis of the hub.

Figure 16:
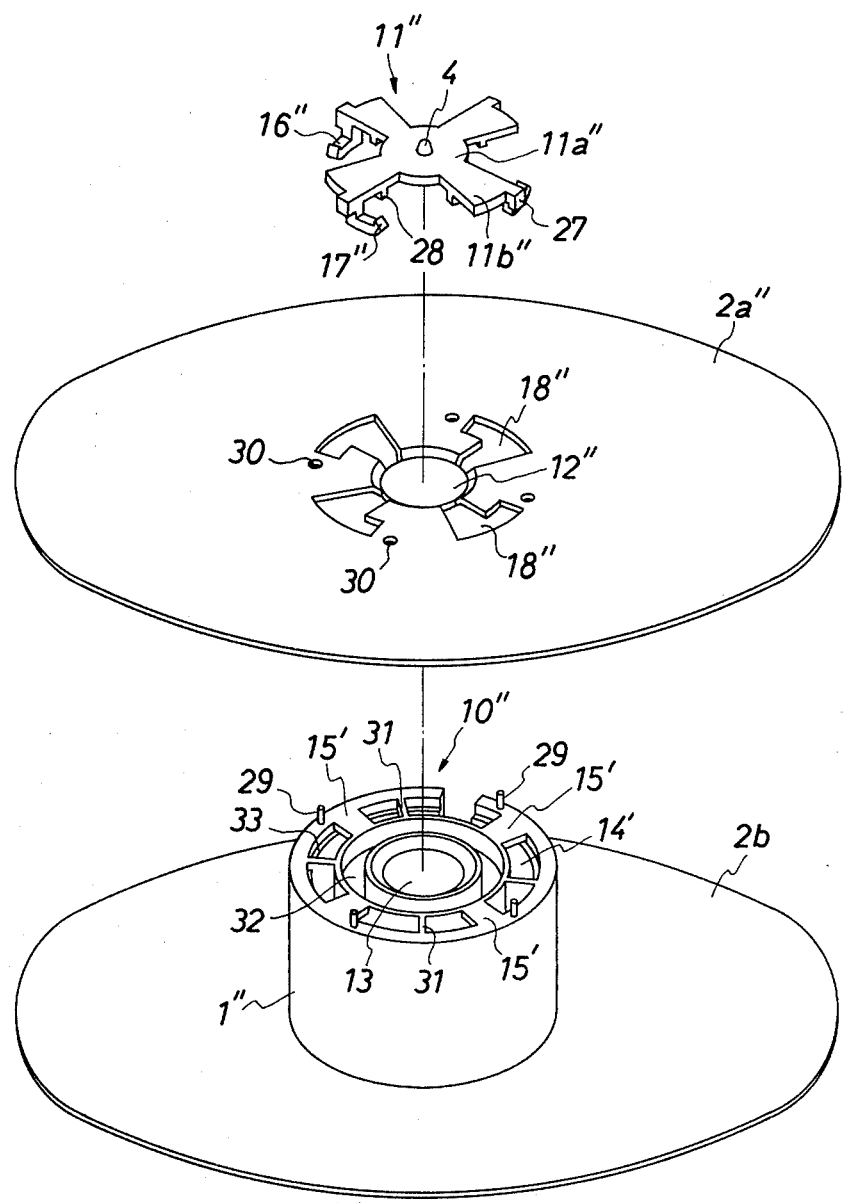
FIG. 16 is an exploded perspective view of the third preferred embodiment of the tape reel according to the present invention.
Figure 17:
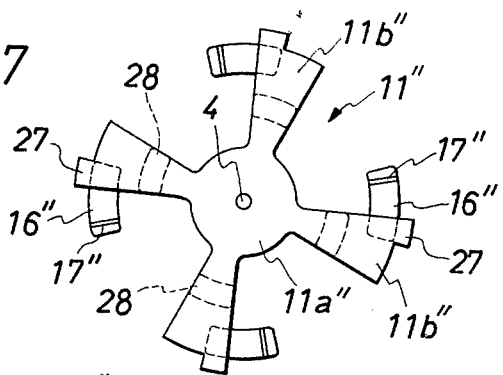
FIG. 17 is a plan view of the small protuberance carrier means in the tape reel shown in FIG. 16.
Figure 18:
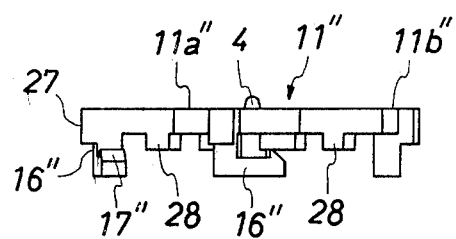
FIG. 18 is a side view of the small protuberance carrier means of FIG. 17.

The carrier means 11" which carries the small protuberance 4 possesses extended portions 11b" which, as illustrated in FIGS. 16 through 18, protrude in the radial directions at suitable angular intervals from the peripheral edge of the central principal part (which is similarly in the form of a small disc) of the carrier means.

From one lateral end at the circumferential edge of each extended portion 11b", there hangs down leg-shaped engaging means 16" incorporating an L-shaped bend whose horizontal member falls similarly in a circumferential direction and is provided at the tip thereof with an upwardly protruding claw 17". From the edge in the radial direction of each extended portion 11b", a small ear portion 27 of a slightly increased wall thickness protrudes in the radial direction. Halfway of the entire radial length of each extended portion 11b", a small ridge 28 is raised in the circumferential direction from the reverse side of the extended portion. The small ridge 28 will be described hereinafter.

Figure 19:
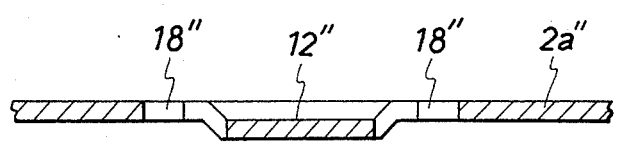
FIG. 19 is a longitudinally sectioned view of the upper flange in the third preferred embodiment.

The separately molded flange 2a", similarly to that involved in the first preferred embodiment, is provided at the center thereof with a central depressed portion 12" for mounting therein the principal part 11a" of the small protuberance carrier means 11" and, at the same time, allowing the surface of the principal part 11a" to rest flush with the surface of the flange 2a" (FIGS. 16 and 19). It is further provided with openings 18" for admitting the extended portions 11b" of the small protuberance carrier means and the leg-shaped engaging means 16" at the locations corresponding to the respective extended portions 11b".

The shape and size of these openings 18" are as follows. These openings 18" are formed in a shape and a circumferential size such that they are capable of completely accommodating the extended portions 11b" and the engaging legs 16" of the small protuberance carrier means 11" when they are initially inserted therein as shown by the imaginary line A in FIG. 20 and, thereafter, allowing the carrier means and consequently the extended portions 11b" in their initially received positions to be rotated by a fixed angle in the circumferential direction as will be touched upon afterward in the description of the operation of assemblage. On completion of this rotation, the extended portions and the leg-shaped engaging means of the carrier means assume the position indicated by the imaginary line B in FIG. 20. Thus, in the initially inserted position (indicated by the imaginary line A), the lateral edge of each extended portion opposite to the edge adjoining the engaging means is held in contact with the corresponding edge of the opening 18". After the subsequent rotation, the front edge of the extended portion relative to the direction of rotation comes into contact with the corresponding edge of the opening 18" and, at the same time, the claw 17" of the leg-shaped engaging means comes to assume a position behind the flange 2a".

The free end 10" of the hub 1" is provided with a central recession 13" for receiving the depressed portion 12" of the flange 2a". It is also provided near the periphery thereof with a groove 14" formed in the circumferential direction. Crosspieces 15' are formed across this groove 14" in the radial directions.

These crosspieces 15' constitute themselves complementary engaging means with respect to the aforementioned leg-shaped engaging means having claws 17" extending in the circumferential direction.

Now, the procedure for the assemblage of the tape reel having the construction described above will be described. Similarly to the first and second preferred embodiments, the separately molded flange 2a" is mounted on the free end of the hub in such a manner that the central depressed portion of the flange rests snugly in the central recess 13" of the free end of the hub. Then, the small protuberance carrier means 11" is set in position so that the central principal part 11a" thereof enters the central depressed portion of the flange 2a" and, at the same time, the extended portions 11b" and the leg-shaped engaging means 16" thereof naturally come to rest in position inside the openings 18" of the flange (as indicated by the imaginary line A of FIG. 20). The state consequently assumed is illustrated in FIG. 21. At this time, the leg-shaped engaging means 16" enter the groove 14" of the hub's free end in the axial direction and assume a position such that the claws 17" confront the corresponding crosspiece 15'. In this diagram, the flange 2a" is omitted to provide a better view of the relevant parts. Only the contour of the edge of the opening 18" is indicated by the imaginary line.

Conversely, when the flange 2a" is mounted on the free end of the hub, it is necessary that it should be initially positioned in such a relationship as to enable the carrier means 11" to advance downwardly via the openings 18" into the groove 14". The efficiency of this work is improved by raising pins 29 at suitable positions on the free end of the hub and forming corresponding through holes 30 on the flange 2a" side, whereby the required relative positions of the components are safely assumed by simply joining the pins with the through holes.

Figure 20:
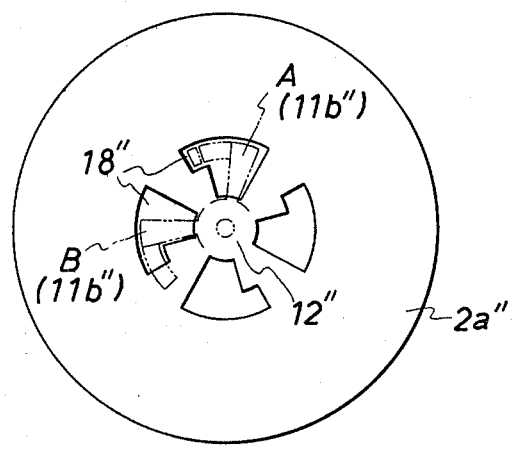
FIG. 20 is a plan view of the flange of FIG. 19.
Figure 21:
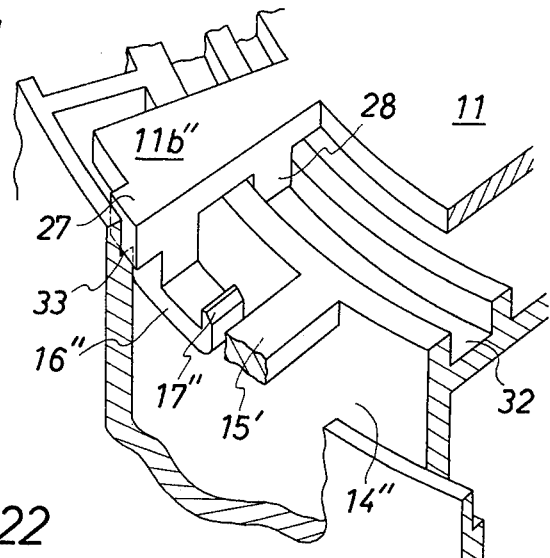
FIG. 21 is an enlarged, partially cut-away perspective view of important parts in the third preferred embodiment in the state assumed during the assemblage of reel.
Figure 22:
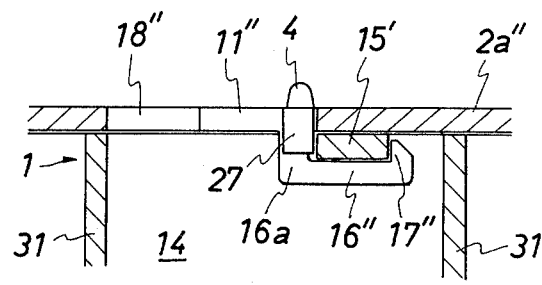
FIG. 22 is a longitudinally sectioned view of the important parts of the third preferred embodiment in the state assumed after completion of the assemblage of the small protuberance carrier means with the upper flange.
Figure 23:
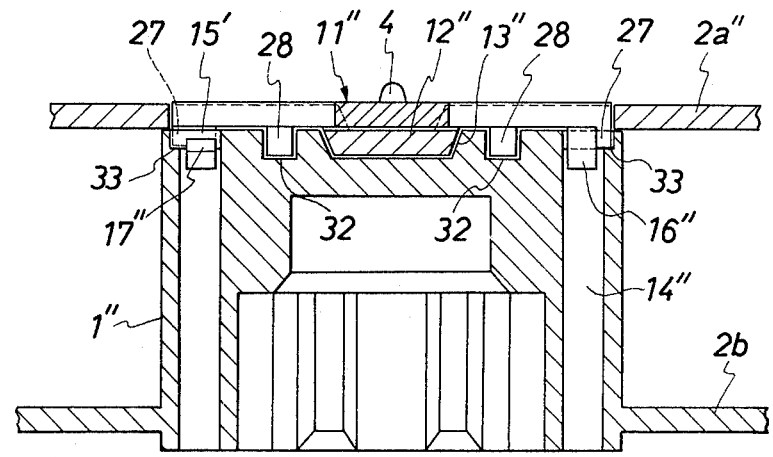
FIG. 23 is a sectioned view of the tape reel of the third preferred embodiment in the state assumed after completion of the assemblage of the reel.

Then, from the position assumed as indicated above, the small protuberance carrier means is rotated in the direction of the claws 17" so as to be brought to the position indicated by the imaginary line B in FIG. 20. As a result, the claws 17" collide into the lateral edges of the crosspieces 15" and begin to ride over the rear surfaces of the crosspieces while being displaced downwardly. As they finally ride past the opposite edges of the crosspieces 15, they snap and rebound by virtue of their own resilience, enabling the inward surfaces of the claws 17" to engage the aforementioned opposite edges of the crosspieces (FIG. 22). Consequently, the small protuberance carrier means and the free end of the hub unreturnably engage each other and concurrently retain the separately molded flange 2a" therebetween (particularly against the central depressed portion 12"), bringing the assemblage to completion (FIG. 23). Of course, the leg-shaped engaging means 16" as the complementary engaging means and the crosspieces 15" are correlated so as to entail an essential requirement that the distance between the downwardly hanging portion 16a of the leg-shaped engaging means (FIG. 22) and the inward surface of the corresponding claw 17" should be approximately equal to the width of the crosspiece 15" in the circumferential direction, for example.

Again with reference to FIG. 21, effective rotation of the leg-shaped engaging means 16" toward the corresponding crosspieces 15" inevitably entails a precondition that the engaging means should be completely received within the groove 14" and that, by this reason, the portions of the grooe 14" corresponding to the engaging means should possess vacant spaces large enough to accommodate them. The remaining portions of the groove 14" which have absolutely nothing to do with the union between the engaging means and the crosspieces may be without vacant space. Otherwise, in these portions of the groove, radial knobs 31 serving to connect reinforcingly the central portion and the peripheral portion of the hub must be suitably disposed as clearly illustrated in FIGS. 16 and 22.

In the present preferred embodiment, however, the small ridges 28 are raised from the reverse surfaces of the extended portions 11" halfway of the entire length thereof at a fixed radial distance from the center of the carrier means as previously described. These ridges are intended to be inserted into the guide groove 32 formed in the circumferential direction between the central portion 13" and the groove 14" along the periphery of the free end of the hub. During the rotation of the small protuberance carrier means, the ridges serve as a guide. The ear portions 27 which protrude from the leading ends of the extended portions in their radial directions are intended to come into contact with the upper surface of the stepped portion 33 formed along the edge of the free end on the outer one of the opposed walls defining the groove 16". These ear portions, owing to their contact with the stepped portion, function to preclude the bending of the extended portions 11b" toward the interior of the groove 14" which may possibly occur when, depending on the condition under which force is exerted on the carrier means, the rotation of the small protuberance carrier means produces in the extended portions 11b" not merely a torque in the circumferential direction but also a compressive force downwardly in the axial direction. The claws 17" of the engaging means 16" may be adapted to fulfill the function of engagement by entering the downward grooves formed on the reverse surfaces of the crosspieces 15" in the radial direction, for example, instead of being adapted to come into contact with the outlet edges of the crosspieces.

No matter which of the various preferred embodiments described above may be adopted, this invention produces its fundamental effect by allowing the small protuberance 4 which comes into contact with the rebound piece formed on the cassette housing for the purpose of keeping the tape reel in position to be formed integrally on the small protuberance carrier means which may be produced in a relatively small size. The carrier means incorporating the small protuberance is made of an expensive resin possessing high wear resistance, but the two flanges and the hub which account for the greater part of the whole volume of the tape reel can be made of an expensive resin or other similarly inexpensive material. Thus, the tape reel of this invention enjoys the advantage that it offers notably high economy and great convenience of assemblage. It promises immensely high practical utility heretofore unattained by the conventional tape reels of the same operating principle.

What is claimed is:

1. A tape reel for a video tape cassette, comprising: a hub having first and second end surfaces; a first flange disposed on said first end surface of said hub; first engaging means carried by said hub near said second end surface; a second flange having a plurality of openings and arranged to be positioned against said hub second end surface; a carrier member having a small integrally formed protuberance at the center of one surface ad resilient second engaging means disposed on the other surface thereof, said carrier member being arranged to contact said second flange opposite said hub second end surface with said second engaging means passing through said openings of said second flange and resiliently lockingly engaging said first engaging means of said hub, whereby the locking engagement between said first and second engaging means fixes said second flange between said carrier member and said second end surface of said hub.

2. A tape reel according to claim 1, wherein said first flange is integrally formed with said first end surface of said hub.

3. A tape reel according to claim 1, wherein said carrier member is integrally molded of a wear resistant resin.

4. A tape reel according to claim 3, wherein said wear resistant resin is polyacetal.

5. A tape reel for a tape cassette, comprising: a hub having first and second ends formed from a first material, said hub including engaging means near said second end; a first flange formed from said first material fixed to said hub first end; a second flange formed from said first material arranged to be positioned against said hub second end and including opening means; and a substantially planar carrier member formed from a second material and defining a surface dimension substantially less than the surface dimension of said second flange, said carrier member having a major surface portion arranged to contact said second flange opposite said hub; a centrally disposed protuberance arranged to extend in a direction opposite said second flange, and resilient latch means arranged to extend through said second flange opening means and lockingly engage said engaging means of said hub for fixing said second flange and said carrier member to said hub while minimizing the use of said second material.

6. A tape reel as defined in claim 5 wherein said second flange further includes a recessed portion dimension for receiving said carrier member and having a depth substantially equal to the thickness of said carrier member for rendering the surfaces of said second flange and said carrier member opposite said hub substantially co-planar when assembled.

* * * * *